United States Patent [19]

Hood et al.

[11] 4,171,723
[45] Oct. 23, 1979

[54] CROP UPROOTING AND SOIL CULTIVATING APPARATUS AND METHOD FOR USE OF SAME

[75] Inventors: Clarence E. Hood; Byron K. Webb, both of Clemson, S.C.; Yekutiel Alper, Bet Dagan, Israel

[73] Assignee: Clemson University, Clemson, S.C.

[21] Appl. No.: 859,226

[22] Filed: Dec. 9, 1977

[51] Int. Cl.² .................... A01B 39/19; A01B 63/12
[52] U.S. Cl. ........................................ 172/1; 172/6; 172/38; 172/44
[58] Field of Search ................. 172/1, 5, 6, 38, 44, 172/233, 311, 720; 56/10.2, 327 R, 327 A, DIG. 15

[56] References Cited

U.S. PATENT DOCUMENTS

| | | | |
|---|---|---|---|
| 2,614,475 | 10/1952 | Mowbray | 172/44 |
| 2,628,546 | 2/1953 | Kempling | 172/44 |
| 2,954,085 | 9/1960 | Roberts | 172/44 |
| 3,186,494 | 6/1965 | Jackson | 172/44 |
| 3,537,530 | 11/1970 | Bettencourt et al. | 172/720 X |
| 3,637,027 | 1/1972 | Kovar | 172/311 |
| 3,690,383 | 9/1972 | Malley et al. | 56/327 R X |

FOREIGN PATENT DOCUMENTS 978452 11/1950 France ...................... 172/108

*Primary Examiner*—Richard T. Stouffer
*Attorney, Agent, or Firm*—Wellington M. Manning, Jr.; Luke J. Wilburn, Jr.

[57] ABSTRACT

Crop uprooting and cultivating apparatus which includes at least one bar having at least one angled edge thereon that extends from a support at least partially across a row to be cultivated or from which crops and/or foliage are to be uprooted. The bar is rotatably supported by a support structure in cantilever fashion, leaving an outer end of the bar free. The bar may extend across a crop row in a direction generally transverse to the direction of movement of the apparatus along the row, or may be angled rearwardly with respect thereto to provide a self-cleaning action. The bar rotates beneath the surface of the soil and uproots crops and foliage as it moves along, the direction of rotation being in a direction opposite the direction of travel of the apparatus. A pair of bars may be provided, one being located on each side of a row being cultivated or where crops are to be uprooted with at least one of the bars extending a distance of more than 50 percent of the width of the row. The outer free ends of the pair of bars may overlap. A hydraulic cylinder or the like may be associated with one or all bars to move same horizontally away from the center of the crop row and return same to its normal uprooting, cultivation location. With this arrangement, the apparatus may be utilized in a method for cultivation, the bar or bars being moved away from crop plants along the row upon sight or automatic sensing of the presence of the plant and thus uprooting foliage and working the soil only between the crop plants.

19 Claims, 5 Drawing Figures

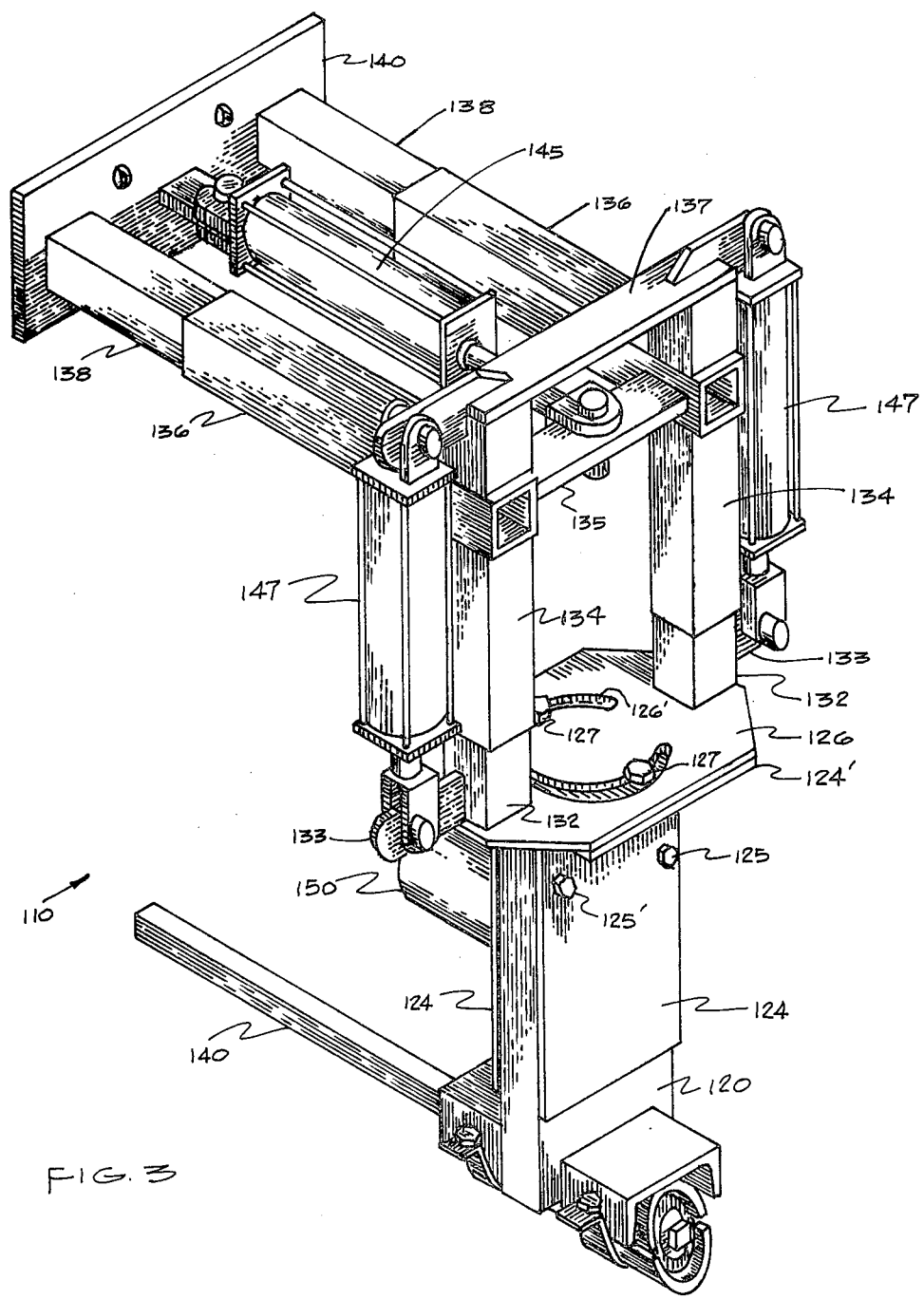

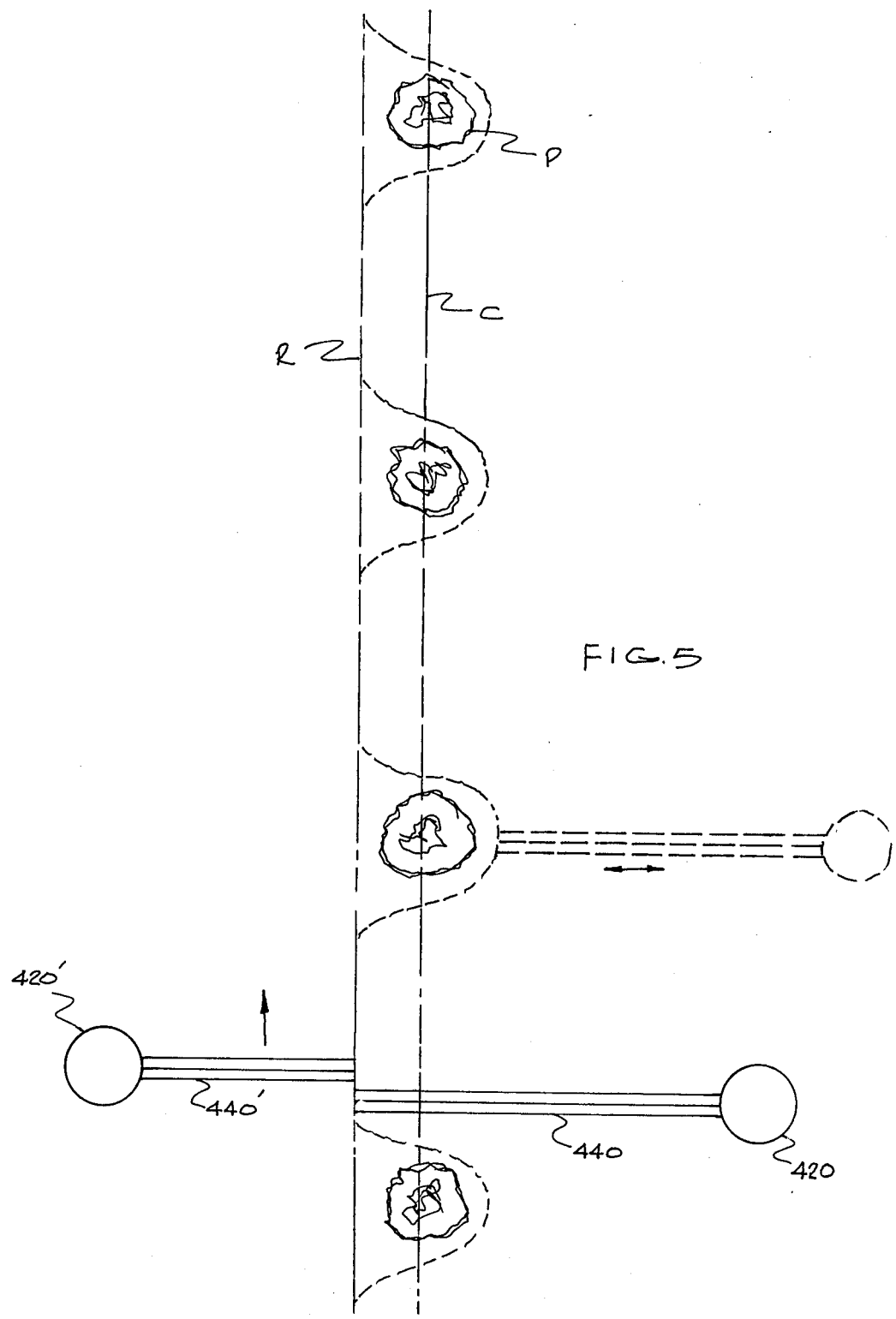

CROP UPROOTING AND SOIL CULTIVATING APPARATUS AND METHOD FOR USE OF SAME

BACKGROUND OF THE INVENTION

This invention relates generally to apparatus for use in conjunction with a transport means such as a tractor or harvester to uproot row crops prior to harvesting, or for use in cultivating row crops at any time during the growth cycle of the plant, and to a method of using same.

Rotating square bars and the like have heretofore been used in conjunction with tractors and harvesters to uproot row crops prior to harvesting. Such uprooting prior to harvesting enables the crop plants to wilt to a certain degree and thus foster removal of the product to be harvested from the plant stalk. Additionally, various and sundry type cutters such as discs, shearing blades and the like have likewise been used to sever crops above and beneath the soil prior to harvesting the products grown thereon.

Problems have in general existed with most of the prior art devices. The cutting or severing type devices have been limited to operation in fields where the soil is in a generally dry state. Rotating bars utilized have been confronted with limitations as to speed of harvesting due to entanglement of foliage around the bars. In a companion application being filed concurrently herewith, a self-cleaning rotating bar arrangement is provided that overcomes the necessity for interrupting the harvesting to clean the bars.

The present invention affords still further improvement in the art, in that, the cantilevered bars of the present invention can be self-cleaning, and further can also be used to cultivate a row crop, while avoiding any damage to the crop plants grown along the row. At the same time, apparatus embodying the principles of the present invention is economical, quite effective and very reliable.

SUMMARY OF THE INVENTION

It is an object of the present invention to provide an improved crop uprooting system.

Another object of the present invention is to provide an improved system for uprooting crops and cultivating row crops that is self-cleaning in nature.

Still another object of the present invention is to provide an improved rotating bar, crop uprooting, cultivating system.

Still another object of the present invention is to provide an improved system for uprooting crops prior to harvesting fruit from the crops.

Yet another object of the present invention is to provide an improved method of cultivating a row crop.

Generally speaking, apparatus embodying principles of the present invention relates to uprooting crops and foliage grown generally in rows, or for cultivating the rows by movement of the apparatus therealong in a fashion to dislodge or uproot weeds and other foliage from the soil between the crop plants, said apparatus comprising a support means, said support means being adapted for attachment to transport means; at least one shaped bar rotatably supported by said support means at one end only, an outer end of said bar being unsupported; and drive means for rotating said bar whereby said bar will rotate at a level beneath the surface of the soil to uproot crops and foliage.

More specifically, apparatus according to the present invention embodies at least one support means, generally vertically oriented with respect to the surface of the soil, and having at least one shaped bar supported in cantilever fashion for rotation thereby. A drive means is generally mounted on the vertical support means and preferably takes the form of a hydraulic motor that is adapted for connection to the conventional hydraulic system of a tractor or other transport means. The drive means is connected, generally by way of a chain drive, to a sprocket surrounding the cantilevered rotatable bar to afford rotation thereto, the direction of rotation being opposite the direction of travel of the apparatus through the crop bed. While the rotatable bar may extend outwardly from the support, generally transverse to the direction of travel of the apparatus, the bar may be angled rearwardly with respect to apparatus travel to define a trailing condition whereby foliage and the like that wraps around the bar will be automatically forced therefrom by action of soil against the foliage to affect a self-cleaning action on the bar.

While a single bar arrangement may be satisfactory, a double bar system may be employed where single bars are cantilevered from respective support means and extend outwardly therefrom in the direction of the opposite support means. The cantilevered bars may be spaced horizontally from each other with the outer free ends of same overlapping to provide a rotating bar action across the entire width of the crop bed. Moreover, when two cantilevered rotatable bars are provided, each bar has its own drive means, though under some arrangements a common drive means could be utilized for both.

While the above defined apparatus may be suitably utilized as described for the uprooting of row crops, the added crop cultivating feature is best provided where an adjustment means such as a hydraulic cylinder is operatively associated with the vertical support means such that upon the detection of a crop plant along the row, either visually by the operator or automatically through a photocell, sonic sensor or the like, the hydraulic cylinder adjustment means is actuated to move the cantilevered bar or bars from the center of the crop bed a sufficient distance to remove the rotating bars from the root system of the crop plant having been detected. After passing the crop plant, reactuation of the hydraulic cylinder will return the rotating bars inwardly to the center of the crop row such that the portion of the crop row between crop plants can be completely weeded by continued operation of the rotating bars.

BRIEF DESCRIPTION OF THE DRAWINGS

FIG. 3 is an isometric view of a single bar crop uprooter, cultivator unit according to the present invention showing a modification thereto.

FIG. 5 is a plan view of a crop row illustrating the cultivation method according to the teachings of the present invention.

DESCRIPTION OF THE PREFERRED EMBODIMENTS

Figure 1:
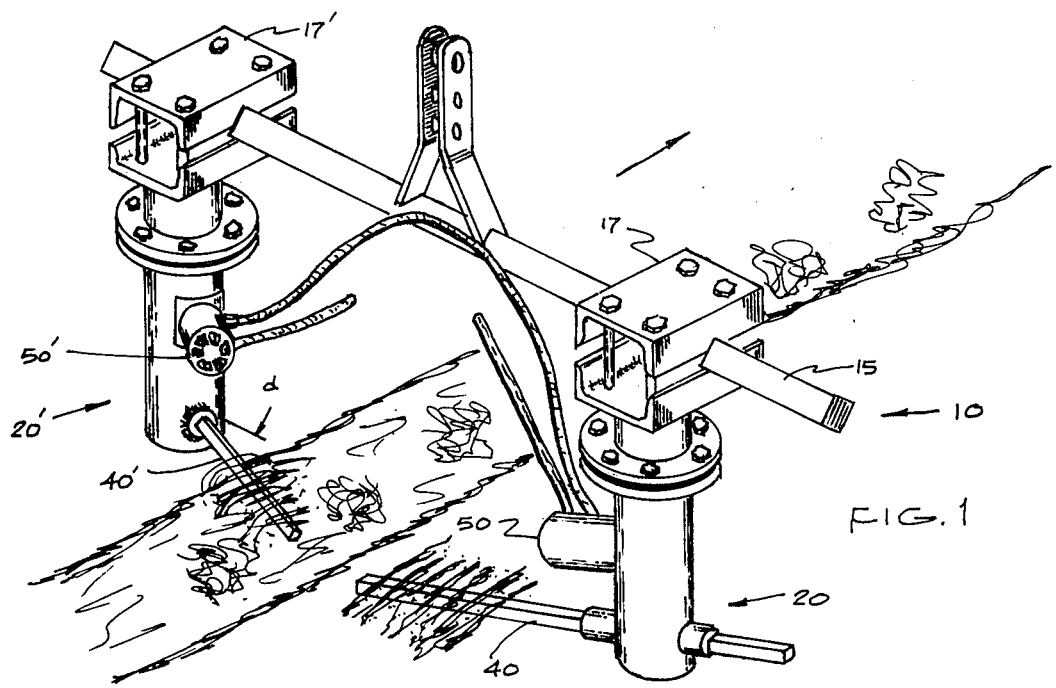
FIG. 1 is an isometric view of a cantilevered bar uprooting and cultivating system embodying principles of the present invention.

Making reference to the Figures, preferred embodiments of the present invention will now be described in detail. In FIG. 1, there is shown a pair of cantilevered bar crop uprooting and cultivating systems generally indicated as 10 that are supported from a conventional tool bar 15 that would be affixed to a tractor or other transport means for moving the system along a crop row in the general direction of the arrow. The cantilevered crop uprooting and cultivating systems generally comprise support means 20 and 20' from which rotatable bars 40 and 40' are respectively cantilevered in the direction of the crop row. Support means 20 and 20' are suspended from the tool bar 15 by clamping elements 17 and 17' having a drive means generally indicated as 50 and 50' associated therewith to provide rotatable driving connection to cutter bars 40 and 40'.

Figure 2:
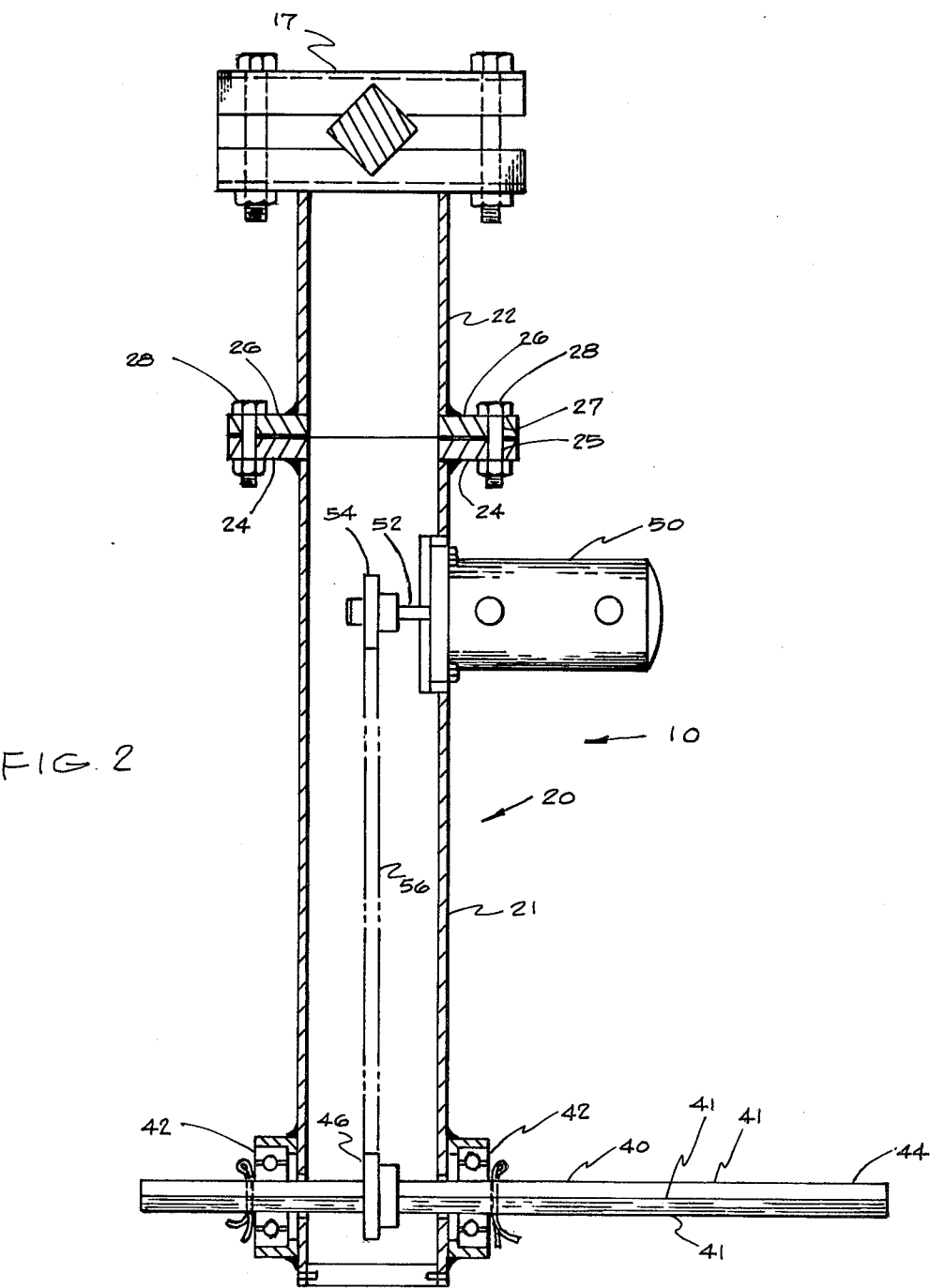
FIG. 2 is a vertical cross sectional view taken substantially through the center of a support means as shown in FIG. 1.

In more detail, only one of the arrangements will be described since both are the same as illustrated. Referring to FIGS. 1 and 2, support means 20 is generally a boxed housing having the cutter bar 40 extending therethrough to be supported in cantilever fashion thereby. Bar 40 is rotatably received by a pair of bearings 42 that are secured to support housing 20. Cutter bar 40 is unsupported at an outer free end 44 of same, the advantages of which will be described in detail hereinafter. Along the length of cutter bar 40 and within housing 20, is a drive sprocket 46. Upwardly from cutter bar 40 and secured to housing 20 is a drive means 50, exemplified by a hydraulic motor. Motor 50 has a motor shaft 52 extending into housing 20 with a drive sprocket 54 secured therealong. A drive chain 56 is in driving connection between motor sprocket 54 and cutter bar sprocket 46 to transfer rotary motion from drive means 50 to cutter bar 40. Cutter bar 40 has at least one angled edge 41 therealong and preferably has a square cross section with four such edges 41.

Support housing 20 is comprised of a lower section 21 and an upper section 22, the purpose of which will become apparent below. Housing section 21 has a flange 24 secured around a terminal portion of same with flange 24 having a series of openings 25 therearound. Likewise housing section 22 has a flange 26 secured around a terminal portion of same with a series of openings 27 therearound, in alignment with openings 25 on flange 24. Flanges 24 and 26 are joined by fastening members 28 that pass through openings 25 and 27 to unite housing sections 21 and 22. As such, the deployment of rotatable bar 40 which is received in lower housing section 21 can be varied by disassembly of flange 24 from flange 26 and reassembly with bar 40 extending the desired direction from housing 20. Note, for example, in FIG. 1 that cutter bars 40 and 40' are rearwardly angled with respect to a line that is transverse to the direction of travel of the system, as defined by an angle alpha. With the cutter bars 40 and 40' angled rearwardly as shown in FIG. 1 foliage or other matter that tends to wrap around the cutter bars will be moved off the cutter bars 40 and 40' by the interaction between rotation of the bar and soil.

FIG. 3 illustrates a further embodiment of a crop uprooter cultivating system embodying principles of the present invention, emphasizing the cultivating feature. A cantilevered bar uprooter and cultivating system generally indicated as 110 is illustrated and comprises a support means 120 having a cutter bar 140 secured thereto in cantilever fashion, with the cutter bar 140 being driven by a drive means 150, such as a hydraulic motor which is adapted for connection to the hydraulic system of a transport means such as a tractor. Support means 120 is received between two plates 124 and secured therein by a shear bolt 125 and a rotation bolt 125'. Plates 124 have a flange 124' located at an upper end of same which abutts a plate 126. Plate 126 is provided with an arcuate slot 126' through which bolts 127 pass for securement of flange 124' to plate 126. With this arrangement, bolts 127 may be loosened and housing 120 and plates 124 may be rotated with respect to plate 126 to properly dispose cutter bar 140. Once at the proper disposition, bolts 127 are retightened to resecure the apparatus.

A pair of vertically disposed arms 132 are secured to plate 126, and extend upwardly into respective telescoping arms 134. A horizontally disposed telescoping arm 136 is secured to each telescoping arm 134 and extends transversely therefrom where it receives a horizontal arm 138. Arms 138 are secured at their opposite ends to an attachment plate 140 which is adapted for attachment to a tractor or other transport means. A horizontal support member 135 is secured between vertical telescoping arms 134 and has a horizontal cylinder means 145 secured at one end thereto. An opposite end of cylinder means 145 is secured to adjustment plate 140. A further horizontal member 137 is secured atop vertical telescoping arms 134 while arms 132 have a protruding member 133 secured thereto. Vertical cylinder means 147 are secured between horizontal support member 137 and protruding member 133. Cylinder means 145 and 147 are preferably hydraulic cylinders with appropriate connections (not shown) to a hydraulic system on the transport means. The above arrangement thus permits horizontal and vertical manueverability for cutter bar 140 and bar 140 may be rotated for a desired angular presentation to a crop row. Likewise shear bolt 125 protects cutter bar 140 from damage in the event a large rock, root or the like might be encountered.

Figure 4:
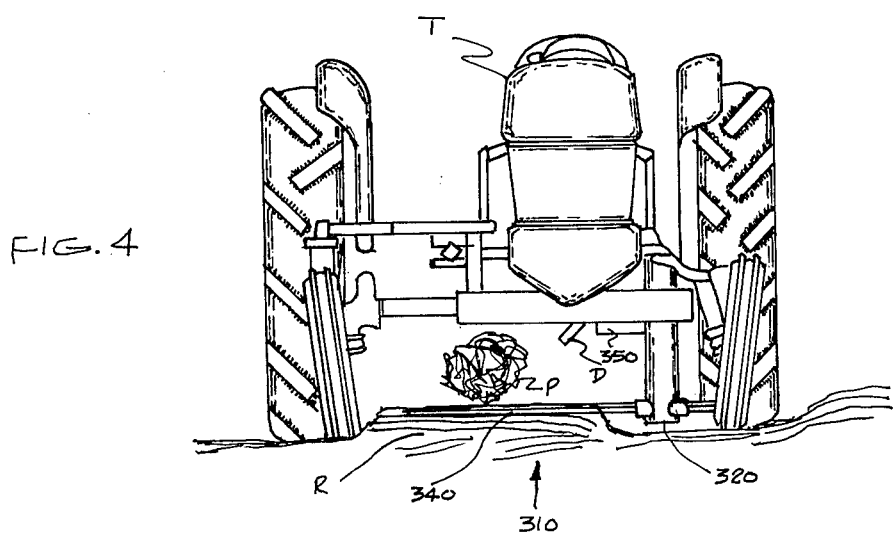
FIG. 4 is a frontal view of a tractor schematically illustrating one embodiment of a crop uprooting, cultivation system according to the present invention.

Making reference to FIG. 4 a tractor T is illustrated as equipped with a cantilevered bar uprooter system 310 according to the present invention wherein a single bar unit 340 is generally shown associated with tractor T with the tractor moving along a row R to cultivate the area along the row between adjacent plants P. For such a procedure, depending upon the particular apparatus employed, movement of the cutter bar 340 into and out of the lateral position for cultivation between plants P may be determined by the operator of the tractor upon visual sighting of plant P. Alternatively, as illustrated in FIG. 4, a plant detector D, that is conventional in the art and may take the form of the photocell, sonic detector or the like, may be secured to a portion of the tractor to automatically detect the presence of a plant P and thereafter actuate the cutter bar lateral adjustment means to move the cutter bars away from the plant root system and thereafter return same across the center or the row after passing the plant. In this fashion, a row crop may be properly cultivated without manual labor. As illustrated in FIG. 4, only one crop uprooting and cultivating unit 310 is associated with tractor T though additional units could be installed as described in FIG. 1, one or both of which may be provided with the lateral adjustment means.

FIG. 5 illustrates a method of cultivating a row crop with apparatus according to the present invention. A crop row R is illustrated having a plurality of plants P therealong with a general center line C extending along row R. As illustrated, a cantilevered bar uprooter and cultivating system is schematically shown in part having support means 420 and 420' from which cantilevered bars 440 and 440' extend outwardly therefrom. The transport apparatus (not shown) will move along the crop row R in the direction as indicated by the arrow with cutter bars 440 and 440' cultivating the soil and uprooting plants therealong, if desired. As shown in the illustrated cultivating system, however, cutter bar 440 only is equipped with an adjustable system as illustrated in FIG. 3 whereby cutter bar 440 is movable in a horizontal or lateral direction as shown by the double headed arrow while cutter bar 440' is stationary and continuously operates along the left edge of row R. Hence as illustrated in solid lines, cutter bar 440 extends across row R to the left edge of same to provide a continuous uprooting and cultivating action between plants. As indicated in the curved dotted line, once a plant is detected, the adjustment system of FIG. 3 is actuated to move the cutter bar 440 to the right and away from the root system of plant P. Thereafter, cutter bar 440 is returned to its normal position as illustrated in solid lines in FIG. 5 and has therefore by-passed plant P. In this fashion, the unit can move along a crop row and cultivate all of the row between adjacent plants. Making reference to FIG. 1, either or both of the two support systems 20 as illustrated, could be equipped with the lateral adjustment system. Where both cutter bars are so equipped the two bars should overlap adjacent the center of the row.

While different embodiments of the present invention have been described, obviously any one of the embodiments may be incorporated into a system containing any other of the embodiments. Additionally, it is believed that the tractor or other transport system generally along with the various controls to actuate the hydraulic systems or to supply power for input and output to the detector systems are well within the purview of one skilled in the art and do not per se form a part of the present invention.

Having described the present invention in detail, it is obvious that one skilled in the art will be able to make variations and modifications thereto without departing from the scope of the invention. Accordingly, the scope of the present invention should be determined only by the claims appended hereto.

What is claimed is:

1. Crop uprooting and cultivating apparatus comprising:
   (a) a support means, said support means being adapted for attachment to transport means for being transported in an operational path of travel along a crop row;
   (b) at least one shaped bar having at least one angled edge thereon rotatably supported by said support means at one position only, and extending outwardly therefrom in a direction generally transverse to the operational path of travel said bar being free of further support from said one position to a terminal end of an operational portion of the bar, the distance from said position to said terminal end representing the majority of the length of the bar; and
   (c) drive means for rotating said bar whereby said bar will rotate at a level beneath the surface of the soil as said bar extends in said generally transverse direction and is being transported along said operational path to uproot crops and foliage.

2. Apparatus as defined in claim 1 wherein said support means comprises a vertically oriented boxed housing, said bar being drivingly supported within said housing.

3. Apparatus as defined in claim 1 wherein said drive means for said bar comprises a motor drivingly connected to said bar.

4. Apparatus as defined in claim 3 wherein said motor is a hydraulic motor, said hydraulic motor being adapted for attachment to a hydraulic system of said transport.

5. Apparatus as defined in claim 1 further comprising means for moving said bar horizontally without vertical displacement whereby crop plants along a crop row can be avoided during uprooting and cultivating.

6. Apparatus as defined in claim 5 wherein said bar movement means include plant sensing means to effect said horizontal movement of said bar out of line with a crop plant under predetermined conditions and to effect return of said bar at other predetermined conditions.

7. Apparatus as defined in claim 1 wherein at least two support means and two bars are provided, one support means and bar being horizontally spaced from said other support means and bar.

8. Apparatus as defined in claim 7 wherein each support means and bar has a separate drive means.

9. Crop uprooting and cultivating apparatus comprising:
   (a) a pair of support means located in a horizontally spacially separate relationship;
   (b) each of said support means having rotatably supported thereon an uprooter, cultivator bar having at least one angled edge therealong, each of said cultivator bars being supported by its respective one of said support means at one position only, each of said bars being free of further support from said one position to a terminal end of an operational portion of the bar, the distance from said position to said terminal end representing the majority of the length of the bar each of said bars extending outwardly from its support means in a direction generally toward said other support means; and
   (c) drive means for rotating said bars.

10. Apparatus as defined in claim 9 wherein said bars overlap at the outer free ends of same, one of said bars being located in front of the other.

11. Apparatus as defined in claim 9 wherein said support means comprise generally vertically oriented boxed housings, said bars being rotatingly supported at said one end within said housing.

12. Apparatus as defined in claim 9 wherein said drive means comprises a separate hydraulic motor for each bar, said hydraulic motors being drivingly connected to said bars within said support means.

13. Apparatus as defined in claim 9 further comprising bar adjustment means operatively associated with at least one of said bars to move said at least one bar horizontally at predetermined intervals without vertical displacement, whereby plants located along a path of travel of said apparatus may be avoided.

14. Apparatus as defined in claim 13 wherein said adjustment means comprises hydraulic cylinder means operatively connected to said support means and sensing means operatively connected to said hydraulic cylinder means, whereby during movement of said apparatus along a crop row, said hydraulic cylinder means is actuated upon sensing a crop plant to move said bar out of line from said plant and thereafter is actuated to return said bar after passing said plant.

15. Apparatus as defined in claim 13 wherein said adjustment means comprises hydraulic cylinder means operatively connected to said support means whereby upon sighting of a plant, said cylinder means may be actuated to move said bar out of line with said plant.

16. Apparatus as defined in claim 15 wherein horizontally and vertically disposed hydraulic cylinder means are included.

17. Apparatus as defined in claim 9 wherein said support means are associated and are adapted for attachment to a transport means.

18. Apparatus as defined in claim 9 wherein said support means are adapted for partial rotational adjustment in a vertical axis of said means whereby the direction of extension of the cutter bar from said support means may be varied.

19. A method for cultivating row crops comprising:
  (a) providing at least one cantilevered rotatably driven bar having at least one angled edge therealong;
  (b) moving said bar along a crop row and rotating said bar beneath the surface of the soil whereby said bar uproots foliage growing in the soil;
  (c) sensing the presence of a crop plant along the row;
  (d) moving said bar horizontally out of line with said plant without vertical displacement; and
  (e) returning said bar to its cultivating position across said row after passing said plant.

* * * * *